United States Patent
Sada et al.

(10) Patent No.: US 12,517,184 B2
(45) Date of Patent: Jan. 6, 2026

(54) INFORMATION PROCESSING METHOD, AND CHARGE CONTROL DEVICE

(71) Applicant: PANASONIC INTELLECTUAL PROPERTY MANAGEMENT CO., LTD., Osaka (JP)

(72) Inventors: Tomokazu Sada, Nara (JP); Takashi Iida, Hyogo (JP); Changhui Yang, Osaka (JP); Takashi Matsuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 465 days.

(21) Appl. No.: 18/004,383

(22) PCT Filed: Jun. 22, 2021

(86) PCT No.: PCT/JP2021/023668
§ 371 (c)(1),
(2) Date: Jan. 5, 2023

(87) PCT Pub. No.: WO2022/014280
PCT Pub. Date: Jan. 20, 2022

(65) Prior Publication Data
US 2023/0296687 A1  Sep. 21, 2023

(30) Foreign Application Priority Data
Jul. 17, 2020 (JP) .................. 2020-122562

(51) Int. Cl.
*G01R 31/392*  (2019.01)
*G01R 31/382*  (2019.01)
(Continued)

(52) U.S. Cl.
CPC ......... *G01R 31/392* (2019.01); *G01R 31/382* (2019.01); *H01M 10/44* (2013.01);
(Continued)

(58) Field of Classification Search
CPC ... G01R 31/392; G01R 31/382; H01M 10/44; H01M 10/48; H01M 2220/20;
(Continued)

(56) References Cited

U.S. PATENT DOCUMENTS

2001/0022518 A1 *  9/2001  Asakura ............... G01R 31/392
                                                             324/426
2002/0109506 A1 *  8/2002  Kawakami ........... G01R 31/392
                                                             324/522
(Continued)

FOREIGN PATENT DOCUMENTS

JP  2000236632 A  *  8/2000  ............. Y02E 60/10
JP  2012-078095 A     4/2012
(Continued)

OTHER PUBLICATIONS

International Search Report dated Aug. 31, 2021 issued in International Patent Application No. PCT/JP2021/023668, with English translation.

*Primary Examiner* — Catherine T. Rastovski
*Assistant Examiner* — Lal Ce Mang
(74) *Attorney, Agent, or Firm* — Rimon P.C.

(57) ABSTRACT

An information processing method, by a computer, includes: instructing a charger for charging a battery to: repeat a charge control including a set of charging having a first interval and charging suspension having a second interval; and finish the charge control when a charge amount reaches a predetermined amount; and acquiring operational data indicating a voltage and a charge capacity of the battery at an end time of each second interval of the charge control.

11 Claims, 7 Drawing Sheets

(51) Int. Cl.
 *H01M 10/44* (2006.01)
 *H01M 10/48* (2006.01)
 *H02J 7/00* (2006.01)

(52) U.S. Cl.
 CPC ......... *H01M 10/48* (2013.01); *H02J 7/00714* (2020.01); *H01M 2220/20* (2013.01)

(58) Field of Classification Search
 CPC . H02J 7/00714; H02J 7/00; H02J 7/04; Y02E 60/10
 See application file for complete search history.

(56) References Cited

U.S. PATENT DOCUMENTS

2003/0235117 A1* 12/2003 Ichikawa ............... G04C 10/04
 368/204
2013/0314050 A1* 11/2013 Matsubara ................ H02J 7/00
 320/134
2021/0152004 A1* 5/2021 Basehore .............. H02J 7/0071

FOREIGN PATENT DOCUMENTS

| JP | 2013-247003 A | 12/2013 | |
|---|---|---|---|
| JP | 5940145 B2 | 6/2016 | |
| JP | 6034954 B2 * | 11/2016 | ............ H02J 7/0071 |
| JP | 2017-125699 A | 7/2017 | |

\* cited by examiner

INFORMATION PROCESSING METHOD, AND CHARGE CONTROL DEVICE

CROSS REFERENCE TO RELATED APPLICATIONS

This application is the U.S. National Phase under 35 U.S.C. § 371 of International Patent Application No. PCT/JP2021/023668, filed on Jun. 22, 2021 which in turn claims the benefit of Japanese Patent Application No. 2020-122562, filed on Jul. 17, 2020, the entire disclosures of which Applications are incorporated by reference herein.

TECHNICAL FIELD

This disclosure relates to a technology for analyzing a degradation state of a chargeable battery.

BACKGROUND ART

A non-destructive analysis called a dV/dQ way of analyzing degradation of constituent elements of a secondary battery, such as the positive electrode (cathode) and the negative electrode (anode), without damaging the secondary battery has been conventionally known. The non-destructive analysis includes: charging or discharging the secondary battery at an extremely low rate; and obtaining, in a time series, an Open Circuit Voltage (OCV) of the secondary battery in the charging or discharging. Then, the degradation state of the secondary battery is estimated on the basis of a differential value indicating a change amount of each OCV to a change amount of a charge capacity of the secondary battery.

For instance, Patent Literature 1 discloses a method of: calculating a differential curve Q-dV/dQ indicating a relation between a battery capacity Q at discharging and a differential value dV/dQ indicating a ratio of a change amount of an open circuit voltage V to a change amount of the battery capacity Q; and estimating, on the basis of a peak form in the differential curve Q-dV/dQ, a degradation state of a secondary battery.

However, the conventional non-destructive analysis requires the charging or discharging at a low rate, and thus needs a long time to estimate the degradation state of the secondary battery.

CITATION LIST

Patent Literature

Patent Literature 1: JP 5940145 B2.

SUMMARY OF INVENTION

This disclosure has been achieved in consideration of the drawbacks described above, and has an object of saving a time required to estimate a degradation state of a battery in use of the non-destructive analysis.

To solve the drawbacks, an information processing method according to an aspect of the disclosure, by a computer, includes: instructing a charger for charging a battery to: repeat a charge control including a set of charging having a first interval and charging suspension having a second interval; and finish the charge control when a charge amount reaches a predetermined amount; and acquiring operational data indicating a voltage and a charge capacity of the battery at an end time of each second interval of the charge control.

DESCRIPTION OF EMBODIMENTS

Figure 1:
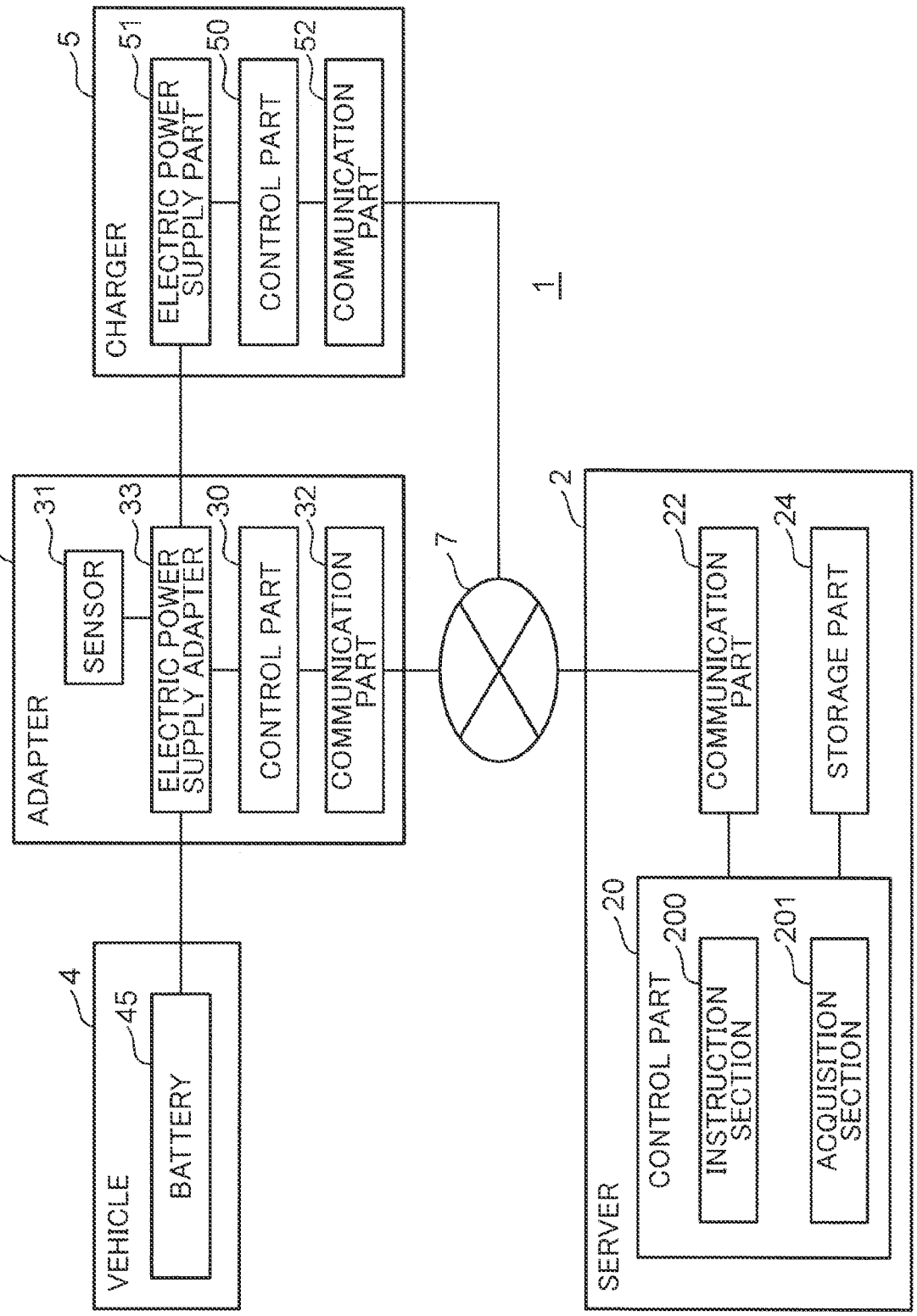
FIG. 1 shows an overall configuration of a degradation analyzing system.

Knowledge Forming the Basis of the Present Disclosure

As described above and disclosed in Patent Literature 1, a non-destructive analysis called a dv/dQ way of analyzing degradation of constituent elements of a secondary battery, such as the positive electrode (cathode) and the negative electrode (anode), without damaging the battery has been conventionally known. The non-destructive analysis includes: charging or discharging the secondary battery for several dozens of hours at an extremely rate so that a satisfactory change is seen in an open circuit voltage of the secondary battery. Under the circumstances, it has been difficult to appropriately estimate the degradation state of the secondary battery while keeping a daily operation of the secondary battery by employing the conventional non-destructive analysis.

Moreover, charging or discharging the battery at a high rate causes a difference in an amount of ions and an amount of electrons to be supplied via an electrolyte between a region around an inlet and outlet part for a charging electric current and a discharging electric current, and another region in the constituent element of the electrode. An unbalanced chemical reaction occurs due to the difference. In this case, there is a risk of a failure to accurately acquire the open circuit voltage of the battery. Hence, the conventional non-destructive analysis requires charging or discharging at an extremely low rate to spread evenly ions and electrons over the constituent elements of the electrode so that the open circuit voltage of the battery is accurately acquired while an occurrence of an unbalanced chemical reaction is suppressed.

The present inventors have conceived of the following aspects according to the disclosure as a result of the considerable studies to avoid the drawbacks.

An information processing method according to an aspect of the disclosure, by a computer, includes: instructing a charger for charging a battery to: repeat a charge control including a set of charging having a first interval and charging suspension having a second interval; and finish the charge control when a charge amount reaches a predetermined amount; and acquiring operational data indicating a voltage and a charge capacity of the battery at an end time of each second interval of the charge control.

According to this aspect, the charger performs the charge control including the set of charging having the first interval and charging suspension having the second interval until the charge amount reaches a predetermined amount. Further, operational data indicating a voltage and a charge capacity of the battery at an end time of each second interval of the charge control is acquired.

Hence, even when an unbalanced chemical reaction occurs inside the battery at the charging to the battery in the first interval, the aspect enables suppression of the unbalanced chemical reaction by suspending the charging in the second interval, and thus achieves acquisition of accurate operational data. This aspect accordingly attains charging to the battery at a rate higher than that of the conventional art in the first interval and charging of a predetermined amount of electric power to the battery in a time shorter than the time required for the conventional art. In this manner, it is possible to save the time required to estimate the degradation state of the battery in use of the non-destructive analysis. As a result, for example, the aspect achieves appropriate estimation of the degradation state of the battery by using such accurate operational data while keeping a daily operation of the battery.

In the aspect, the second interval may be shorter than the first interval.

According to this aspect, the interval for charging to the battery is set to be longer than the interval for suspension of the charging to the battery to enable efficient charging to the battery for estimation of the degradation state of the battery. In other words, the charging time is savable.

In the aspect, the number of repetitions of the charge control may be set so that the charge amount reaches the predetermined amount within a predetermined time.

According to this aspect, the set number of repetitions of the charge control is performed in the predetermined time. Therefore, the aspect enables acquisition of the operational data in the amount equivalent to the set number. Further, the operational data for use in the analysis in the predetermined time is acquirable, and therefore, charging and acquisition of the operational data by a start of use of the battery are achieved.

In the aspect, the first interval and the second interval may be set so that the charge amount reaches the predetermined amount within the predetermined time.

This aspect permits the charge amount to reach the predetermined amount within the predetermined time through the repetitions of the charge control including the set of the charging having the set first interval and the charging suspension having the set second interval. Further, the operational data for use in the analysis in the predetermined time is acquirable, and therefore, charging and acquisition of the operational data by a start of use of the battery are achieved.

In the aspect, the instruction may be made when the predetermined time or longer is ensured to charge the battery.

According to this aspect, the instruction is made when the predetermined time or longer is ensured to charge the battery, and thus, a defect of charging at the start of use of the battery is avoidable.

The aspect may further include: calculating differential data of the voltage to the charge capacity by using the operational data; and estimating a degradation state of the battery by analyzing a peak in the differential data.

This aspect succeeds in saving the time required to estimate the degradation state of the battery by employing a way of analyzing a peak in differential data of a voltage to a charge capacity calculated by using operational data.

In the aspect, the peak in the differential data may include at least one of a first peak concerning the positive electrode of the battery and a second peak concerning the negative electrode of the battery, and, in the estimation of the degradation state of the battery, a degradation state of at least one of the positive electrode and the negative electrode of the battery may be estimated by analyzing at least one of the first peak and the second peak.

According to this aspect, at least one of the first peak concerning the positive electrode of the battery and the second peak concerning the negative electrode of the battery is seen in the differential data satisfactorily for the analysis. Hence, it is possible to estimate the degradation state of at least one of the positive electrode and the negative electrode of the battery while saving the time required to estimate the degradation state of at least one of the positive electrode and the negative electrode of the battery.

In the aspect, the number of repetitions of the charge control may be set to be larger when the charge capacity falls within a first range than when the charge capacity is out of the first range.

According to this aspect, the number of repetitions of the charge control is larger when the charge capacity falls within the first range than when the charge capacity is out of the first range. In this way, the aspect enables acquisition of a larger amount of operational data indicating a charge capacity falling within the first range than an amount of operational data indicating a charge capacity being out of the first range. Consequently, accuracy of estimating the degradation state is maintainable or improvable. In addition, the number of times of the charging suspension or intervals thereof is relatively reduced outside the first range. This succeeds in saving the time required for the charge amount to reach the predetermined amount while ensuring the operational data necessary for the analysis in the first range. Meanwhile, the charge control may be intermittently repeated, or the repetitions of the charge control may be suspended and the charging may be continued outside the first range.

In the aspect, a charging electric current in the charge control may be set to be smaller when the charge capacity falls within the first range than when the charge capacity is out of the first range.

According to this aspect, the charging electric current is set to be smaller when the charge capacity falls within the first range than when the charge capacity is out of the first range. In this way, a degree of increase in the charge capacity at the charging having the first interval is smaller when the charge capacity falls within the first range than when the charge capacity is out of the first range. Thus, the number of repetitions of the charge control is larger when the charge capacity falls within the first range than when the charge capacity is out of the first range. As a result, the aspect enables acquisition of a larger amount of operational data indicating a charge capacity falling within the first range than an amount of operational data indicating a charge capacity being out of the first range. Consequently, accuracy of estimating the degradation state is maintainable or improvable. Besides, an occurrence of an unbalanced chemical reaction inside the battery in the first interval is more suppressible when the charge capacity falls within the first range than when the charge capacity is out of the first range. In addition, a charging rate is kept to be low, and accordingly, degradation attributed to the charging is suppressible.

In the aspect, the second interval may be set to be longer when the charge capacity falls within the first range than when the charge capacity is out of the first range.

According to this aspect, the second interval is set to be longer when the charge capacity falls within the first range than when the charge capacity is out of the first range. Hence, the aspect enables acquisition of operational data with a smaller unbalanced chemical reaction inside the battery in the first interval when the charge capacity falls within the first range. In other words, an influence attributed to the unbalanced chemical reaction in the acquired operational data is more suppressible in comparison with the case where the charge capacity is out of the first range. In this way, the aspect achieves acquisition of operational data suitable for estimation of a degradation state. In other words, the accuracy of estimating the degradation state with use of the operational data is improvable.

In the aspect, the first range may represent a range of the charge capacity that has the peak in the differential data of the voltage to the charge capacity, the differential data being calculated by using the operational data.

According to this aspect, the first range represents a range of the charge capacity that has the peak in the differential data indicating the change amount of the voltage to the change amount of the charge capacity, the differential data being calculated by using the operational data. Therefore, this aspect allows the differential data calculated by using the operational data indicating the charge capacity falling within the first range to include the peak. In this manner, this aspect attains improvement in the accuracy of estimating the degradation state of the battery by using analysis of the peak.

A charge control device according to another aspect of the disclosure controls a charger for charging a battery. The charge controlling device includes: an instruction section that instructs the charger to repeat a charge control including a set of charging having a first interval and charging suspension having a second interval, and finish the charge control when a charge amount reaches a predetermined amount; and an acquisition section that acquires operational data indicating a voltage and a charge capacity of the battery at an end time of each second interval of the charge control.

According to this aspect, the charger performs the charge control including the set of charging having the first interval and charging suspension having the second interval until the charge amount reaches a predetermined amount. Further, operational data indicating a voltage and a charge capacity of the battery at an end time of each second interval of the charge control is acquired.

Hence, even when an unbalanced chemical reaction occurs inside the battery at the charging to the battery in the first interval, the aspect enables suppression of the unbalanced chemical reaction by suspending the charging in the second interval, and thus achieves acquisition of accurate operational data. This aspect accordingly attains charging to the battery at a rate higher than that of the conventional art in the first interval and charging of a predetermined amount of electric power to the battery in a time shorter than the time required for the conventional art. In this manner, it is possible to save the time required to estimate the degradation state of the battery in use of the non-destructive analysis. As a result, for example, the aspect achieves appropriate estimation of the degradation state of the battery by using such accurate operational data while keeping a daily operation of the battery.

In the aspect, the charger includes: a receiving part that receives a charge instruction; a charge control part which is configured to, in accordance with the charge instruction: repeat a charge control including a set of charging having a first interval and charging suspension having a second interval; and finish the charge control when a charge amount reaches a predetermined amount; and a transmission part that transmits operational data indicating a voltage and a charge capacity of the battery in the charge control.

According to this configuration, the transmission of the charge instruction to the charger leads to successful acquisition of the operational data, from the charger, indicating the voltage and the charge capacity of the battery in the repetitions of the charge control including the set of the charging having the first interval and the charging suspension having the second interval.

Hence, even when an unbalanced chemical reaction occurs inside the battery at the charging to the battery in the first interval, the aspect enables suppression of the unbalanced chemical reaction by suspending the charging in the second interval, and thus achieves acquisition of accurate operational data. This aspect accordingly attains charging to the battery at a rate higher than that of the conventional art in the first interval and charging of a predetermined amount of electric power to the battery in a time shorter than the time required for the conventional art. In this manner, it is possible to save the time required to estimate the degradation state of the battery in use of the non-destructive analysis. As a result, for example, the aspect achieves appropriate estimation of the degradation state of the battery by using such accurate operational data while keeping a daily operation of the battery.

Embodiment

Hereinafter, a degradation analyzing system in an embodiment of the disclosure will be described with reference to the accompanying drawings. FIG. 1 shows an overall configuration of a degradation analyzing system 1. The degradation analyzing system 1 analyzes a degradation state of a battery 45 mounted on a vehicle 4 which is daily used for an article delivery purpose, a company use purpose, a commuting use purpose, and other purposes.

Specifically, as shown in FIG. 1, the degradation analyzing system 1 includes the vehicle 4, an adapter 3, a charger 5, and a server 2 (charge control device).

The vehicle 4 includes a battery 45. The battery 45 is a chargeable secondary battery, and mainly includes the positive electrode, the negative electrode, an electrolyte, and a separator. The vehicle 4 is driven with electric power charged in the battery 45. The battery 45 is connected to the charger 5 via the adapter 3. The battery 45 is configured to supply the charged electric power to the respective parts of the vehicle 4.

The adapter 3 is provided between the battery 45 and the charger 5. The adapter 3 communicates with the server 2 and the charger 5 to operate the charger 5 in accordance with control information received from the server 2. Specifically, the adapter 3 includes a communication part 32, an electric power supply adapter 33, a sensor 31, and a control part 30.

The communication part 32 includes a communication interface circuit for communicating with an external device, such as the server 2 and the charger 5, via a network 7 like the LAN (Local Area Network) or the internet. The communication part 32 outputs information received from the external device to the control part 30 and transmits information input from the control part 30 to the external device.

The electric power supply adapter 33 is connected to an electric power supply part 51 of the charger 5 and the battery 45 of the vehicle 4, and has, in the inside thereof, an unillustrated electric power line connecting the electric power supply part 51 and the battery 45 to each other. The electric power supply adapter 33 is connected to the control part 30 and the sensor 31, and has, in the inside thereof, an unillustrated communication line connecting the control part 30 and the sensor 31 to each other.

For instance, the sensor 31 includes an electric current sensor and a voltage sensor. The sensor 31 is connected to the electric power line included in the inside of the electric power supply adapter 33 to detect a charging electric current supplied from the charger 5 to the battery 45 and an open circuit voltage (voltage of the battery) between the positive electrode and the negative electrode of the battery 45.

The control part 30 includes a microcomputer having a CPU (Central Processing Unit) and a memory. The control part 30 controls each part of the adapter 3 by executing a control program stored in the memory.

For instance, when the communication part 32 receives control information transmitted from the server 2 to control the charger 5, the control part 30 transmits the received control information to the charger 5 via the communication part 32. In this manner, the control part 30 operates the charger 5 in accordance with the control information received from the server 2. The control part 30 further calculates, on the basis of a detection result from the sensor 31, a charge capacity of the battery 45. The charge capacity of the battery 45 represents an amount of the electric power charged to the battery 45.

The charger 5 controls the charging to the battery 45 in accordance with the control information received from the server 2 via the adapter 3. Specifically, the charger 5 includes a communication part 52 (a transmission part and a receiving part), an electric power supply part 51, and a control part 50 (charge control part).

The communication part 52 includes a communication interface circuit for communicating with an external device, such as the server 2 and the adapter 3, via the network 7. The communication part 52 outputs information received from the external device to the control part 50 and transmits information input from the control part 50 to the external device.

The electric power supply part 51 includes an AC/DC converter and/or a DC/DC converter. The electric power supply part 51 charges the battery 45 by converting electric power supplied from a commercial power supply source into predetermined alternate electric power or direct electric power and supplying the converted electric power to the battery 45 of the vehicle 4 under the control by the control part 50.

The control part 50 includes a microcomputer having a CPU (Central Processing Unit) and a memory. The control part 50 controls each part of the charger 5 by executing a control program stored in the memory.

For instance, when the communication part 52 receives control information indicating a charge instruction for the battery 45, the control part 50 controls the electric power supply part 51 in accordance with the charge instruction indicated by the control information, starts, suspends, and finishes the electric power supply to the battery 45, and further adjusts an amount of the electric power to be supplied to the battery 45. In this manner, the control part 50 starts, suspends, and finishes the charging to the battery 45, and further adjusts a charge amount, in accordance with the charge instruction indicated by the control information.

The server 2 controls the charging to the battery 45 of the vehicle 4 by the charger 5 through communication with the adapter 3. Specifically, the server 2 includes a storage part 24, a communication part 22, and a control part 20.

The storage part 24 includes a storage device, such as an SSD (Solid State Drive) and/or an HDD (Hard Disk Drive), storing a predetermined control program to store various kinds of information about the charging to the battery 45. The information about the charging to the battery 45 includes, for example, information about a material for constituent elements including the positive electrode, the negative electrode, and an electrolyte forming the battery 45.

The communication part 22 includes a communication interface circuit for communicating with an external device, such as the adapter 3 and the charger 5, via the network 7. The communication part 22 outputs information received from the external device to the control part 20 and transmits information input from the control part 20 to the external device.

The control part 20 includes a microcomputer (computer) having a CPU or the like. The control part 20 controls each part of the server 2 by executing a control program stored in the storage part 24.

For instance, the control part 20 serves as an instruction section 200 and an acquisition section 201 by executing a control program stored in the storage part 24.

The instruction section 200 instructs the charger 5 to repeat a charge control including a set of charging having a first interval and charging suspension having a second interval, and finish the charge control when a charge amount reaches a predetermined amount. The acquisition section 201 acquires operational data indicating a voltage and a charge capacity of the battery 45 at an end time of each second interval of the charge control.

Heretofore, described is an example where the communication part 32 of the adapter 3, the communication part 52 of the charger 5, and the communication part 22 of the server 2 communicate with one another via the network 7. However, the communication way is not limited thereto, and the communication part 32 of the adapter 3, the communication part 52 of the charger 5, and the communication part 22 of the server 2 may directly communicate with one another in accordance with a communication standard, for example, the Bluetooth (registered trademark) without passing through the network 7.

Figure 2:
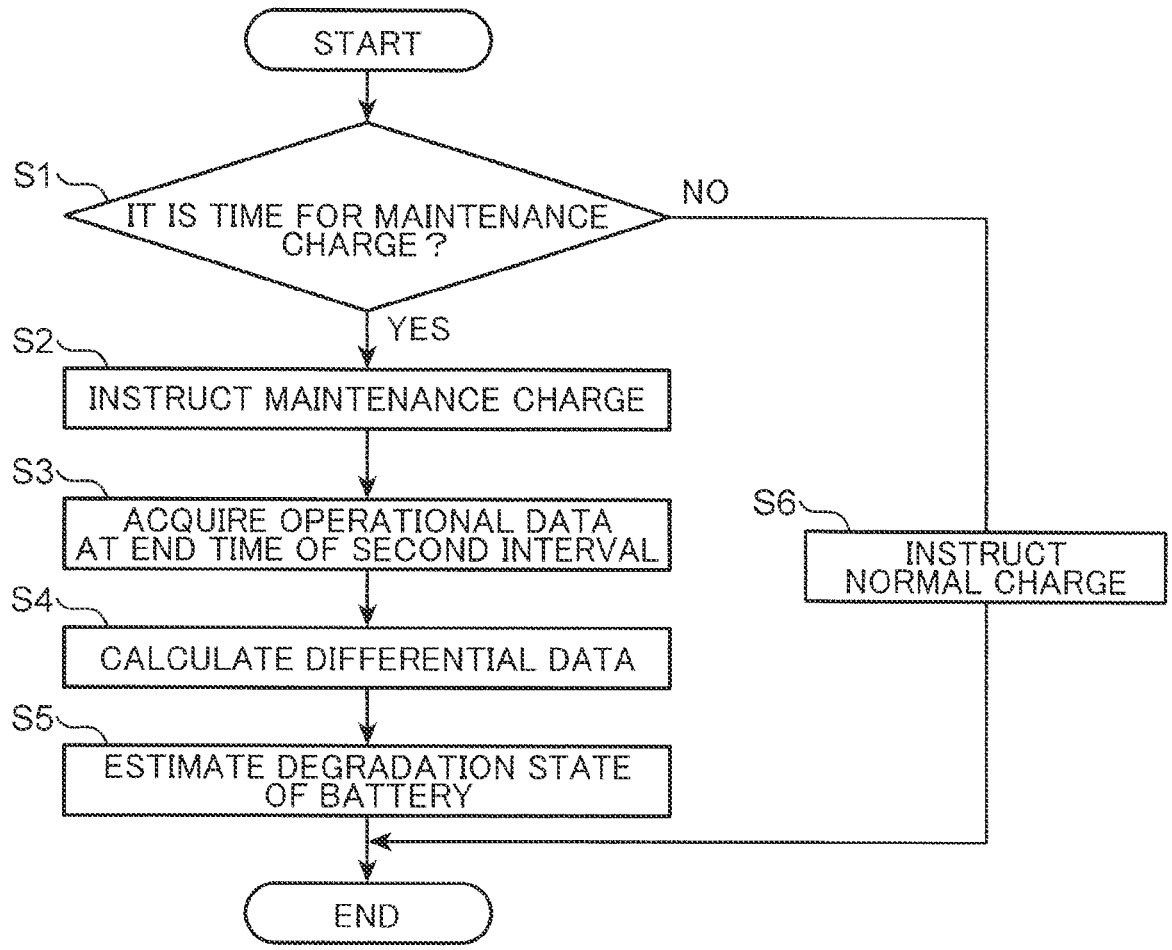
FIG. 2 is a flowchart showing an example of a process by a server in an operation of estimating a degradation state of a battery.
Figure 3:
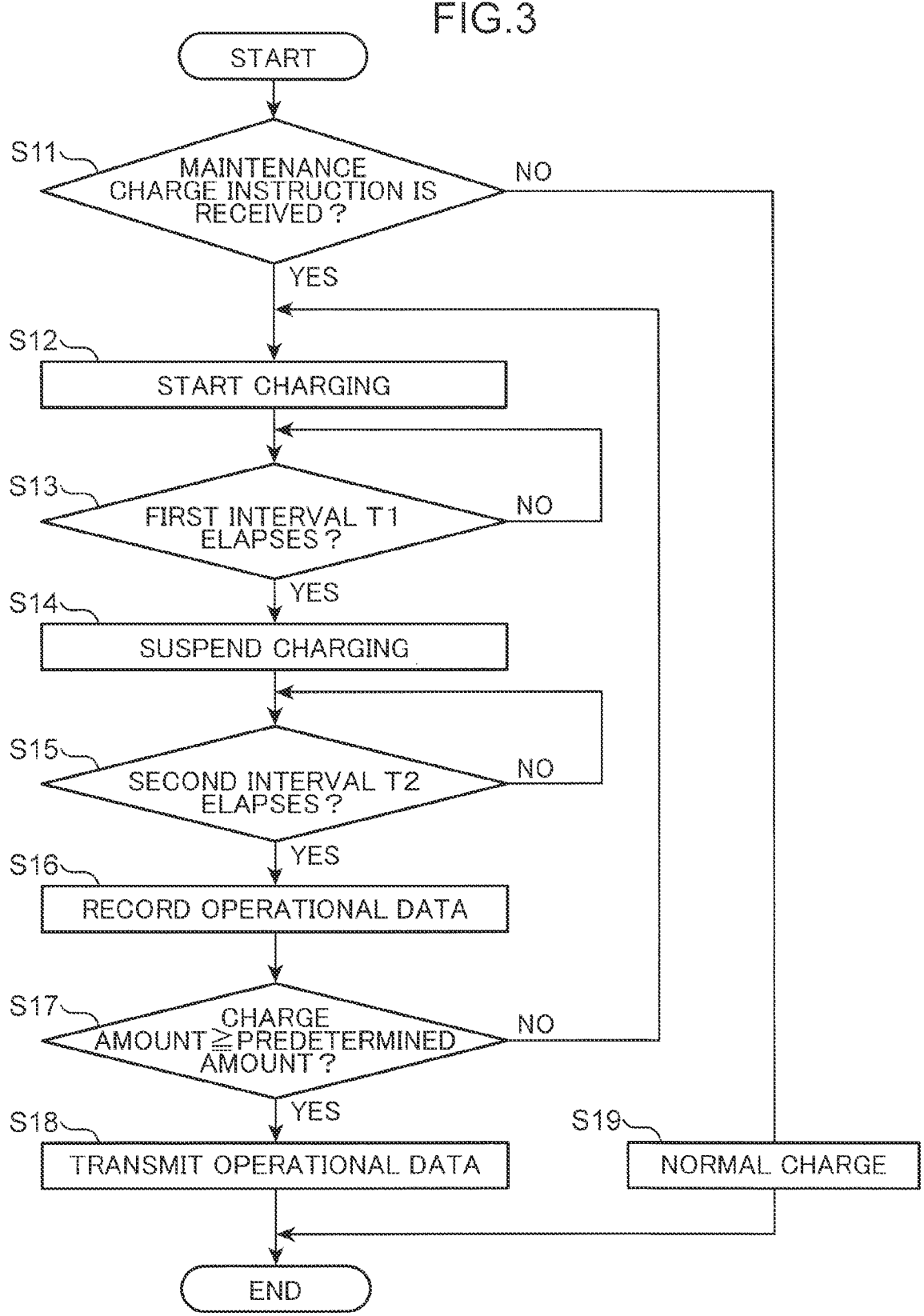
FIG. 3 is a flowchart showing an example of a process by a charger or an adapter in the operation of estimating the degradation state of the battery.

Next, an operation of estimating a degradation state of the battery 45 in the degradation analyzing system 1 will be described. FIG. 2 is a flowchart showing an example of a process by the server 2 in the operation of estimating the degradation state of the battery 45. FIG. 3 is a flowchart showing an example of a process by the charger 5 or the adapter 3 in the operation of estimating the degradation state of the battery 45.

It is presumed that a user connects the battery 45 of the vehicle 4 and the charger 5 to each other via the electric power supply adapter 33 (FIG. 1) of the adapter 3 by using an unillustrated charging cable, and thereafter executes a predetermined manipulation to start charging to the battery 45. The predetermined manipulation may be executed in any one of the charger 5, the vehicle 4, the adapter 3, and the server 2. The predetermined manipulation may be executed with a mobile terminal, such as a smartphone, owned by the user. When the predetermined manipulation is executed, information indicating an instruction of starting the charging to the battery 45 may be transmitted to the server 2. The information indicating the instruction of starting the charging may be transmitted to the server 2 on the basis of a charging schedule in place of the predetermined manipulation. When the server 2 manages the charging schedule, the server 2 may determine the start of the charging.

When the communication part 22 of the server 2 receives the information indicating the instruction of starting the charging to the battery 45, the instruction section 200 determines whether it is time for a maintenance charge as shown in FIG. 2 (step S1). The maintenance charge represents a charging operation about the battery 45 to be conducted for estimating a degradation state of the battery 45.

For instance, in step S1, the instruction section 200 determines that it is time for the maintenance charge (YES in step S1) when a predetermined period (e.g., a period of three months) elapses from a date and time of a previous maintenance charge. Contrarily, the instruction section 200 determines that it is not time for the maintenance charge (NO in step S1) when the predetermined period does not elapse from the date and time of the previous maintenance charge.

Besides, when the vehicle 4 represents a company vehicle or a delivery vehicle for delivering articles, an expected date and time for a subsequent use of the vehicle 4 is predetermined in some cases. In such cases, the storage part 24 of the server 2 may store information indicating the expected date and time for the subsequent use of the vehicle 4 in advance. In step S1, the instruction section 200 may determine whether it is time for the maintenance charge in accordance with a predetermined time or longer that is ensured by the expected date and time for the subsequent use of the vehicle 4. Here, the predetermined time may be set to be longer (e.g., ten hours) than, for example, the time required for the maintenance charge.

In step S1, when determining that it is not time for the maintenance charge (NO in step S1), the instruction section 200 transmits control information indicating a charge instruction for a normal charge to the adapter 3 via the communication part 22 (step S6).

As shown in FIG. 3, in the adapter 3, when the communication part 32 receives the control information indicating the charge instruction for the normal charge as transmitted in step S6 (No in step S11), the control part 30 controls the communication part 32 to transmit the control information to the charger 5. In the charger 5, when the communication part 52 receives the control information, the control part 50 executes the normal charge in accordance with the charge instruction indicated by the control information (step S19). Specifically, the control part 50 causes the electric power supply part 51 to convert the electric power supplied from the commercial power supply source into predetermined alternate electric power or direct electric power to supply the converted electric power to the battery 45 of the vehicle 4.

Contrarily, when determining that it is time for the maintenance charge in step S1 as shown in FIG. 2 (YES in step S1), the instruction section 200 transmits control information indicating a charge instruction for the maintenance charge to the adapter 3 via the communication part 22 (step S2). The charge instruction for the maintenance charge represents an instruction of repeating a charge control including: charging to the battery 45 with a charging electric current having a predetermined electric current value in a first interval; and subsequent charging suspension in a second interval, and further finishing the charge control when the charge amount reaches a predetermined amount.

As shown in FIG. 3, in the adapter 3, when the communication part 32 receives the control information indicating the charge instruction for the maintenance charge as transmitted in step S2 (YES in step S11), the control part 30 controls the communication part 32 to transmit the control information to the charger 5. Further, the control part 30 controls the sensor 31 to periodically detect a charging electric current supplied to the battery 45 and an open circuit voltage of the battery 45. Besides, the control part 30 periodically calculates, on the basis of a detection result from the sensor 31, a charge capacity of the battery 45.

In the charger 5, when the communication part 52 receives the control information indicating the charge instruction for the maintenance charge, the control part 50 starts a charging operation for the battery 45 in accordance with the charge instruction for the maintenance charge indicated by the control information (step S12). Specifically, in step S12, the control part 50 controls the electric power supply part 51 to supply a charging electric current having a predetermined electric current value to the battery 45.

The control part 50 continues the charging operation until a first interval T1 elapses (NO in step S13) after the charging operation for the battery 45 is started in step S12. The control part 50 suspends the charging operation (step S14) at a lapse of the first interval T1 (YES in step S13) after the start of the charging operation. Specifically, in step S14, the control part 50 controls the electric power supply part 51 to suspend the supply of the charging electric current to the battery 45.

The control part 50 is in a standby state until a second interval T2 elapses (NO in step S15) after the charging operation is suspended in step S14. The control part 50 transmits information indicating an end of the second interval T2 to the adapter 3 at a lapse of the second interval T2 (YES in step S15) after the charging operation is suspended in step S14. In the adapter 3, when the communication part 32 receives the information indicating the end of the second interval T2, the control part 30 causes the memory to record operational data indicating the open circuit voltage of the battery 45 detected by the sensor 31 at the receipt of the information and the charge capacity of the battery 45 calculated at the receipt of the information in association with a date and time of the receipt (step S16). The control part 50 determines whether the charge amount reaches a predetermined amount (step S17). Here, the charge amount represents an amount of electric power supplied to the battery 45.

Specifically, in step S17, the control part 50 calculates an integrated value of the charging electric current supplied to the battery 45 as the charge amount, and determines whether the calculated charge amount is equal to or larger than the predetermined amount. In step S17, when determining that the charge amount reaches the predetermined amount (YES in step S17), the control part 50 transmits information indicating a finish of the maintenance charge to the adapter 3.

In the adapter 3, when the communication part 32 receives the information indicating the finish of the maintenance charge, the control part 30 controls the communication part 32 to transmit, to the server 2, the operational data stored in the memory together with information indicating a date and time associated with the operational data (step S18).

Contrarily, in step S17, when determining that the charge amount does not reach the predetermined amount (NO in step S17), the control part 50 repeats step S12 and the subsequent steps. In this respect, the control part 50 repeats the charge control including the set of the charging operation having the first interval T1 and the charging suspension having the second interval T2.

As shown in FIG. 2, after step S2, in the server 2, when the communication part 22 receives the operational data and information indicating the date and time, the acquisition section 201 acquires operational data received by the communication part 22 in order of older one corresponding to information on an older date and time (step S3).

Subsequently, the control part 20 calculates differential data of an open circuit voltage to a charge capacity by using the operational data acquired in step S3 (step S4). Specifically, the control part 20 calculates the differential data by using the following Equation (1):

$$dV/dQ(n)=(V_n-V_{n-1})/(Q_n-Q_{n-1}) \quad (1)$$

In Equation (1), the sign "dV/dQ(n)" denotes differential data on a date and time "n". The sign "$V_n$" denotes an open circuit voltage included in operational data for the date and time n, and the sign "$Q_n$" denotes a charge capacity included in the operational data for the date and time n. The sign "$V_{n-1}$" denotes an open circuit voltage included in operational data for a date and time "n−1" as acquired prior to the operational data for the date and time n. The sign "$Q_{n-1}$" denotes a charge capacity included in the operational data for the date and time n−1 as acquired prior to the operational data for the date and time n. Meanwhile, a process such as addition arithmetic averaging a value of differential data dV/dQ(n) on a near date and time may be executed to suppress a noise component included in the aforementioned differential data dV/dQ(n).

Next, the control part 20 estimates a degradation state of the battery 45 by analyzing a peak in the differential data calculated in step S4 (step S5), and finish the process. Details of step S5 will be describe later.

The control part 20 is in a standby state without executing the process until the operational data is received after sending the control information indicating the charge instruction for the maintenance charge to the adapter 3, in step S2. However, in place of being in the standby state, the control part 20 may send the control information indicating the execution instruction in each of step S12 and S14 to the charger 5 via the adapter 3, and make the determination in each of step S13, step S15, and step S17.

In this case, the control part 30 of the adapter 3 may cause the communication part 32 to transmit information indicating a charging electric current detected by the sensor 31 to the server 2 after the communication part 32 receives the control information indicating the execution instruction in step S12 so that the control part 20 makes the determination in step S17.

Specific Example of a Charging Electric Current and an Open Circuit Voltage

Figure 4:
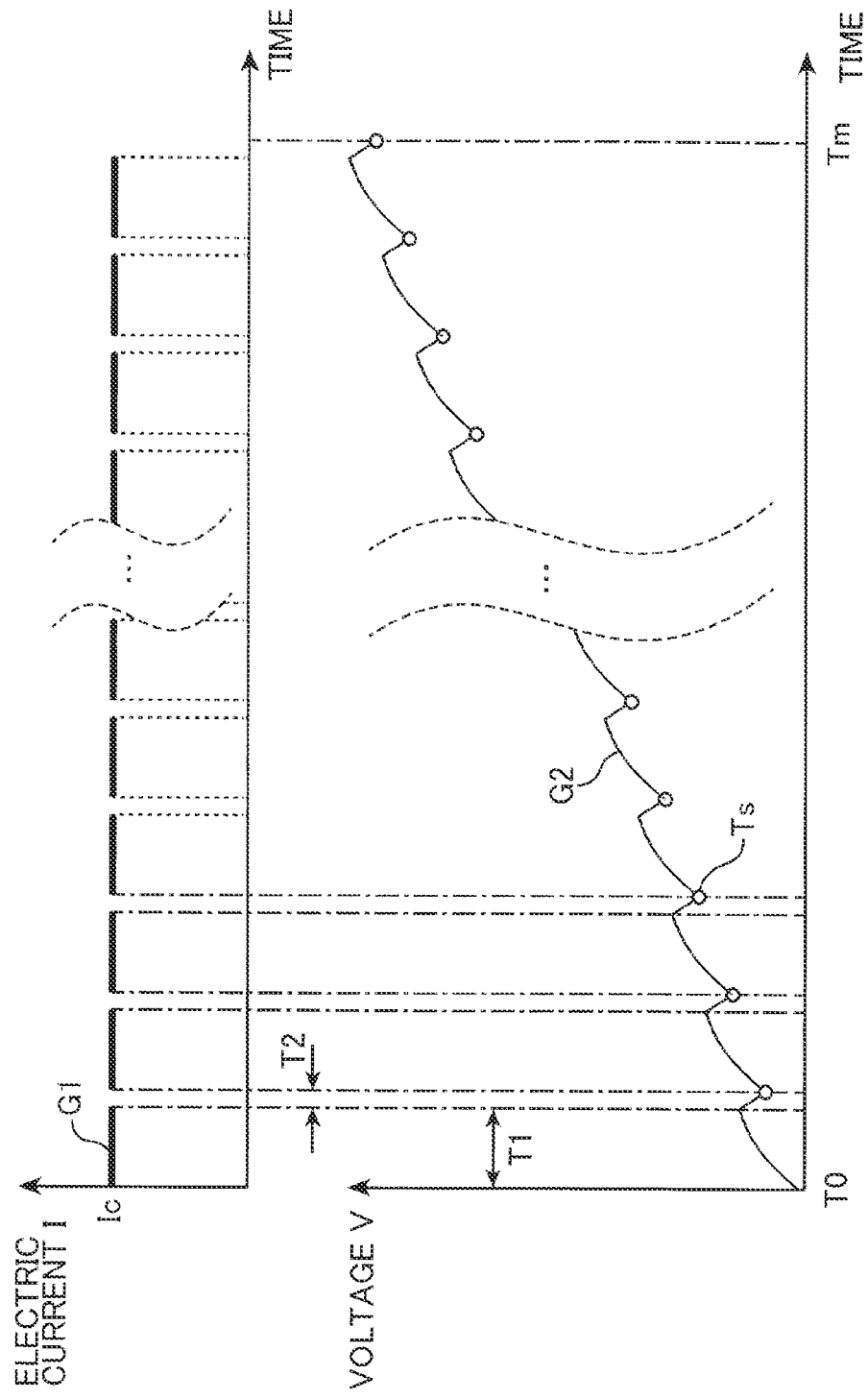
FIG. 4 shows graphs respectively exemplifying a charging electric current supplied to the battery and an open circuit voltage of the battery, as detected in a maintenance charge.

Next, a specific example of a charging electric current supplied to the battery 45 and an open circuit voltage of the battery, as detected in a maintenance charge, will be described. In the specific example, it is presumed that the maintenance charge is started from an empty state of the battery 45. FIG. 4 shows graphs respectively exemplifying a charging electric current I supplied to the battery 45 and an open circuit voltage V of the battery 45, as detected in a maintenance charge.

A graph G1 located above in FIG. 4 shows a chronological change in the charging electric current I in the maintenance charge, and has a horizontal axis denoting a time and a vertical axis denoting the charging electric current I. A graph G2 located below in FIG. 4 shows a chronological change in the open circuit voltage V of the battery 45 detected by the sensor 31 in the maintenance charge, and has a horizontal axis denoting a time and a vertical axis denoting the open circuit voltage V.

When the maintenance charge is started, the charging electric current I having an electric current value Ic is supplied to the battery 45 in the first interval T1 as shown in the graph G1. Owing to the supply, the open circuit voltage V of the battery 45 detected by the sensor 31 gradually increases as shown in the graph G2.

The charging operation is suspended in the second interval T2 at the lapse of the first interval T1, and the charging electric current I is suspended from being supplied to the battery 45 as shown in the graph G1. Owing to the suspension, an unbalanced chemical reaction occurring inside the battery 45 in the first interval is gradually suppressed, and the open circuit voltage V of the battery 45 detected by the sensor 31 gradually decreases as shown in the graph G2. Moreover, at an end time Ts of the second interval T2, operational data indicating the open circuit voltage V detected by the sensor 31 and the charge capacity of the battery 45 calculated by the control part 30 is transmitted to the server 2.

As described above, the charge control including the set of the charging having the first interval T1 and the charging suspension having the second interval T2 is repeated in the maintenance charge. Then, the maintenance charge is finished at a time Tm when the charge amount supplied from the charger 5 to the battery 45 reaches the predetermined amount. Meanwhile, a charge amount supplied from the charger 5 to the battery 45 is calculated by using the following Equation (2).

$$Pc=Ic \times T1 \times m \quad (2)$$

In Equation (2), the sign "Pc" denotes a charge amount supplied from the charger 5 to the battery 45, and the sign "m" denotes the number of times of charging having the first interval T1 as conducted until calculation of the charge amount.

In the example in FIG. 4, the second interval T2 is set to be shorter than the first interval T1. Specifically, in the specific example, the interval for charging to the battery 45 is set to be longer than the interval for suspension of the charging to the battery 45 to thereby achieve an efficient maintenance charge for estimation of a degradation state of the battery 45. However, the setting of the intervals is not limited thereto, and the second interval T2 may be set to be longer than the first interval T1 when a long charging time is ensured.

Besides, in the example shown in FIG. 3, each of the electric current value Ic of the charging electric current I, the first interval T1, and the second interval T2 is set so that the charge amount of the battery 45 reaches a predetermined amount (so that the battery is fully charged) within a predetermined time (e.g., around seven hours) through the maintenance charge. Specifically, the electric current value Ic of the charging electric current I is set to 0.2 C required to complete the charging to the battery 45 in five hours. The first interval T1 is set to three minutes and the second interval T2 is set to one minute. However, the setting of the electric current value Ic of the charging electric current I and the first interval T1 is not limited thereto, and the value and the interval may be set so that the charge amount in the first interval T1 reaches around SOC 1% of the battery 45. Specifically, the charge control may be repeated around 100 times when the maintenance charge is conducted from an empty state of the battery 45 to a fully charged state thereof.

The number of repetitions of the charge control may be appropriately set so that the charge amount reaches the predetermined amount by a lapse of a predetermined time (e.g., eight hours) from the start of the maintenance charge. Alternatively, the number of repetitions (e.g., 100 times) of the charge control may be set so that the charge amount reaches the predetermined amount by a lapse of the predetermined time (e.g., eight hours) from the start of the maintenance charge, and the first interval T1 and the second interval T2 may be appropriately set in accordance with the setting.

Further alternatively, the electric current value Ic of the charging electric current I in the first interval T1 may be adjusted so that the charge amount reaches the predetermined amount by a lapse of a predetermined time from the start of the maintenance charge when it is difficult to adjust each of the number of repetitions of the charge control, the first interval T1, and the second interval T2. It is noted here that the unbalanced chemical reaction occurring inside the battery becomes larger in the first interval T1 as the electric current value Ic is increased. In this respect, the second interval T2 may be adjusted to be longer as the electric current value Ic is increased.

Example of Estimation of a Degradation State of the Battery 45

Figure 5:
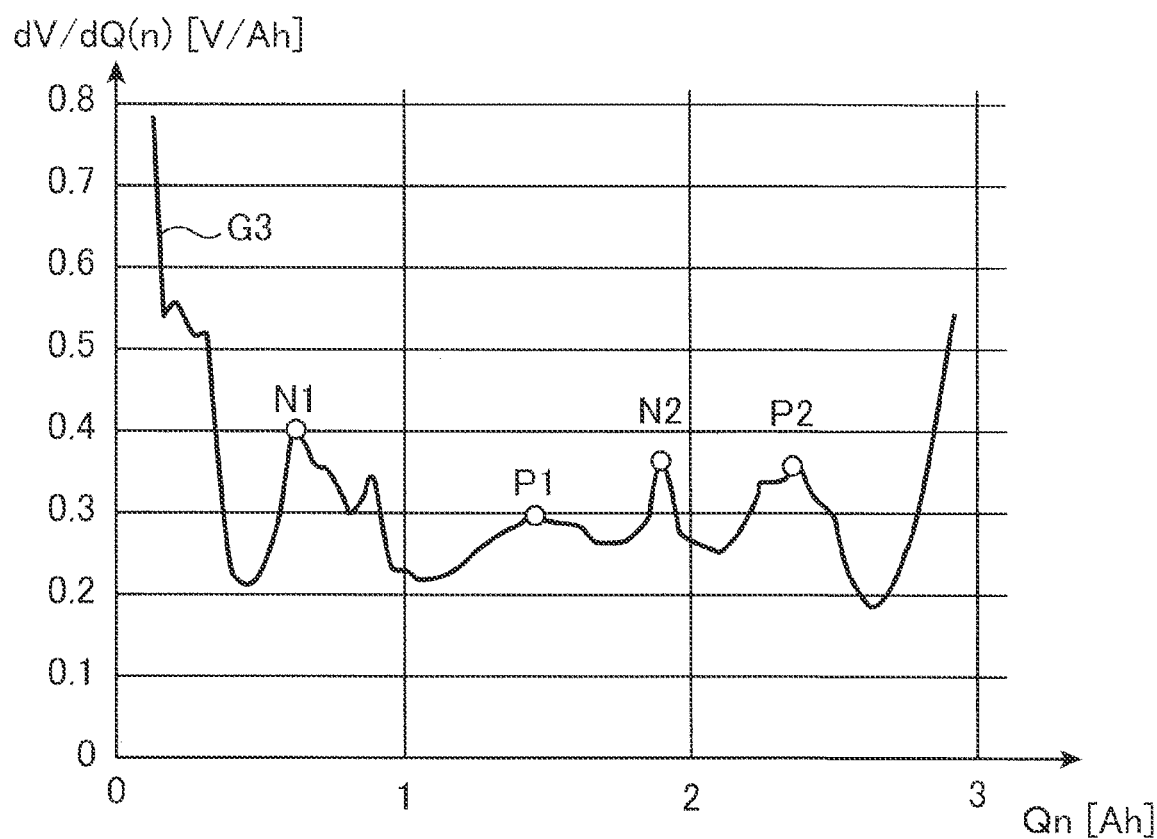
FIG. 5 shows a graph exemplifying a relation between a charge capacity and differential data.

Next, a specific example of estimation of a degradation state of the battery 45 as executed in step S5 (FIG. 2) will be described. FIG. 5 shows a graph G3 exemplifying a relation between a charge capacity $Q_n$ and differential data dV/dQ(n). A vertical axis in FIG. 5 denotes the differential data dV/dQ(n) on the date and time n calculated in step S4 (FIG. 2), and a horizontal axis in FIG. 5 denotes the charge capacity $Q_n$ of the battery 45 on the date and time n. In step S5 (FIG. 2), the control part 20 generates the graph G3 showing the relation between the charge capacity $Q_n$ and the differential data dV/dQ(N) of the battery 45 as shown in FIG. 5.

The control part 20 defines, in the generated graph G3, each of inflection points N1, P1, N2, and P2 changing from an increase tendency to a decrease tendency of the differential data dV/dQ(n) as a peak in the differential data dV/dQ(n).

Here, it can be determined, on the basis of a test value and in accordance with a material of constituent elements including the positive electrode and the negative electrode of the battery 45, whether each peak corresponds to an open circuit voltage of either the positive electrode or the negative electrode. In the example shown in FIG. 5, the inflection points N1, P1, N2, P2 each defined as a peak seen in the differential data dV/dQ(n) represent open circuit voltages respectively of the negative electrode, the positive electrode, the negative electrode, and the positive electrode.

Then, the control part 20 estimates a degradation state of a capacity of the positive electrode by analyzing a charge capacity $Q_n$ and differential data dV/dQ(n) at each of the inflection points P1, P2 each defined as the peak corresponding to the open circuit voltage of the positive electrode. The control part 20 further estimates a degradation state of a capacity of the negative electrode by analyzing a charge capacity $Q_n$ and differential data dV/dQ(n) at each of the inflection points N1, N2 each defined as a peak corresponding to the open circuit voltage of the negative electrode.

The control part 20 further estimates a reaction balance between the positive electrode and the negative electrode by analyzing the charge capacity $Q_n$ and the differential data dV/dQ(n) at each of the inflection points N1, P1, N2, P2.

The differential data dV/dQ(n) may have a peak corresponding to the open circuit voltage of only one of the positive electrode and the negative electrode due to a material of the constituent elements including the positive electrode and the negative electrode of the battery 45. In this case, the control part 20 estimates a degradation state of a capacity of the one of the electrodes by analyzing the peak corresponding to the open circuit voltage of the one electrode.

First Modification

In the embodiment, described is the example of detecting the open circuit voltage between the positive electrode and the negative electrode of the battery 45 in the maintenance charge. However, when the battery 45 is decomposable in a laboratory, the sensor 31 (FIG. 1) may individually detect an open circuit voltage of the positive electrode and an open circuit voltage of the negative electrode. Accordingly, the adapter 3 may transmit, to the server 2, operational data indicating the detected open circuit voltage of each of the positive electrode and the negative electrode and a charge capacity of the battery 45.

In this case, in step S4 (FIG. 2), the control part 20 may individually calculate, by using the operational data acquired in step S3 (FIG. 2), differential data (hereinafter, referred to as differential data of the positive electrode) of the open circuit voltage of the positive electrode to the charge capacity, and differential data (hereinafter, referred to as differential data of the negative electrode) of the open circuit voltage of the negative electrode to the charge capacity.

The control part 20 may generate a graph showing a relation between a charge capacity $Q_n$ of the battery 45 and differential data of the positive electrode thereof, and estimate capacity degradation of the positive electrode by analyzing a peak in the differential data of the positive electrode in the graph.

Similarly, the control part 20 may generate a graph showing a relation between a charge capacity $Q_n$ of the battery 45 and differential data of the negative electrode thereof, and estimate capacity degradation of the negative electrode by analyzing a peak in the differential data of the negative electrode in the graph.

Alternatively, but similarly, the sensor 31 may detect only one of the open circuit voltage of the positive electrode and the open circuit voltage of the negative electrode, and capacity degradation of only the one electrode may be estimated.

Second Modification

In the embodiment, described is the example where the charge control including the set of the charging having the first interval T1 and the charging suspension having the second interval T2 is repeated in the maintenance charge without changing the electric current value Ic of the charging electric current I, the first interval T1, and the second interval T2. However, instead, the charge control may be repeated by changing at least one of the electric current value Ic of the charging electric current I, the first interval T1, and the second interval T2 depending on a range of a charge capacity $Q_n$ of the battery 45.

For instance, it is presumed that past estimation of a degradation state of the battery 45 leads to preliminary grasping of a relation between a charge capacity $Q_n$ of the battery 45 and differential data dV/dQ(n) of the battery 45, as shown in FIG. 5. In this case, a range of the charge capacity (e.g., 0.5 Ah to 0.8 Ah) where the differential data dV/dQ(n) of the battery 45 has a peak (e.g., N1) may be defined as a first range.

In the first case, when a charge capacity of the battery 45 calculated by the control part 30 falls within the first range, one of the electric current value Ic of the charging electric current I and the first interval T1 in each of the situation where the charge capacity falls within the first range and the situation where the charge capacity is out of the first range may be changed. In this way, the number of repetitions of the charge control may be larger and the operational data to be acquired may be greater than those in the situation where the charge capacity is out of the first range to improve accuracy about a peak in the differential data dV/dQ of the battery 45.

Specifically, the electric current value Ic of the charging electric current I may be set to be smaller when the charge capacity falls within the first range than when the charge capacity is out of the first range. Alternatively, the first interval T1 may be set to be shorter when the charge capacity falls within the first range than when the charge capacity is out of the first range. From these perspectives, a charge amount to be charged in the first interval T1 may be set to be smaller when the charge capacity falls within the first range, and the number of repetitions of the charge control may be larger when the charge capacity falls within the first range.

In the second case, the second interval T2 may be set to be longer when the charge capacity falls within the first range than when the charge capacity is out of the first range. In this manner, the accuracy of causing the peak to come into existence in the differential data dV/dQ(n) of the battery 45 may be improved. An unbalanced chemical reaction occurring inside the battery 45 in the charging in the first interval T1 is suppressible.

In the first or second case, the second interval T2 may be set to be shorter (or "0") when the charge capacity is out of the first range. In addition, the electric current value Ic of the charging electric current I may be set to be larger when the charge capacity is out of the first range than when the charge capacity falls within the first range. This achieves saving of the time required for maintenance charge.

Moreover, ways of changing at least one of the electric current value Ic of the charging electric current I, the first interval T1, and the second interval T2 may be combined.

Third Modification

In the embodiment, the example where the maintenance charge is started from an empty state of the battery 45 is described with reference to FIG. 4. However, the maintenance charge may be started from a non-empty state of the battery 45 concerning a charged state thereof, and the maintenance charge may be finished when the charge amount reaches a predetermined amount. Then, on another occasion, the maintenance charge may be started from the empty state of the battery 45, and the maintenance charge may be finished when the charge amount reaches the predetermined amount.

As described above, the maintenance charge may be executed on a plurality of occasions, and a specific peak may be appropriately selected from duplicative peaks in differential data dV/dQ(n) calculated from operational data acquired on the occasions, or analysis results of the duplicative peaks may be averaged in step S5 (FIG. 2) to thereby estimate the degradation state of the battery 45.

Fourth Modification

In the above-described embodiment and modifications, the example where the server 2 makes an estimation of a degradation state of the battery 45 is described. Instead, a degradation analyzing system may be configured to permit an adapter to estimate a degradation state of the battery 45 without including the server 2.

Figure 6:
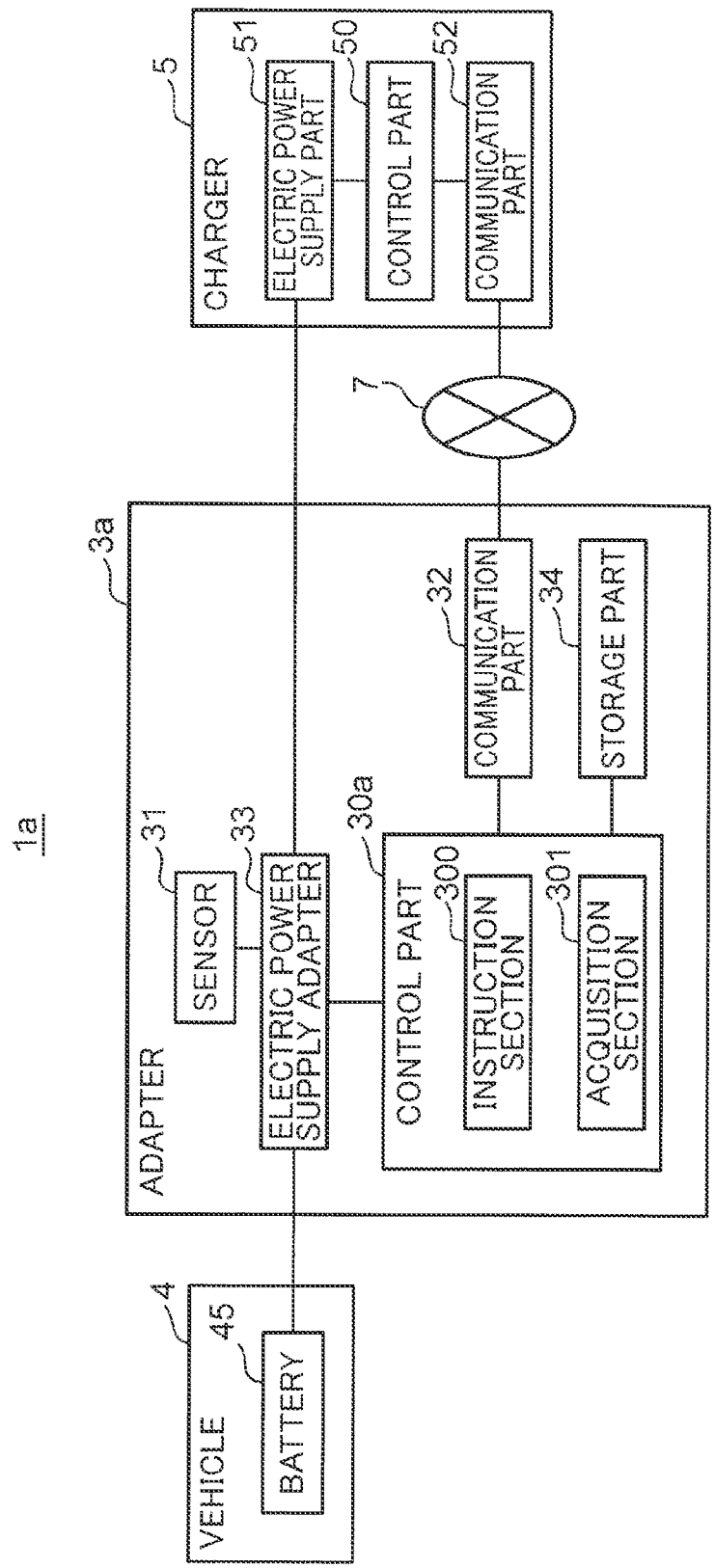
FIG. 6 shows an overall configuration of a degradation analyzing system in a fourth modification.

FIG. 6 shows an overall configuration of a degradation analyzing system 1*a* in a fourth modification. Specifically, as shown in FIG. 6, in the degradation analyzing system 1*a* in this modification, an adapter 3*a* (charge controlling device) includes a storage part 34 similar to the storage part 24 (FIG. 1). A control part 30*a* included in the adapter 3*a* has the same operability as the control part 20 (FIG. 1) of the server 2, and serves as an instruction section 300 and an acquisition section 301 respectively similar to the instruction section 200 and the acquisition section 201 (FIG. 1). A communication part 32 included in the adapter 3*a* and a communication part 52 included in a charger 5 may directly communicate with each other without passing through a network 7 in this modification as well.

Fifth Modification

Unlike the above-described embodiment and modifications, a degradation analyzing system may be configured to permit a vehicle to estimate a degradation state of a battery 45 without including the server 2 and the adapter 3, 3*a*.

Figure 7:
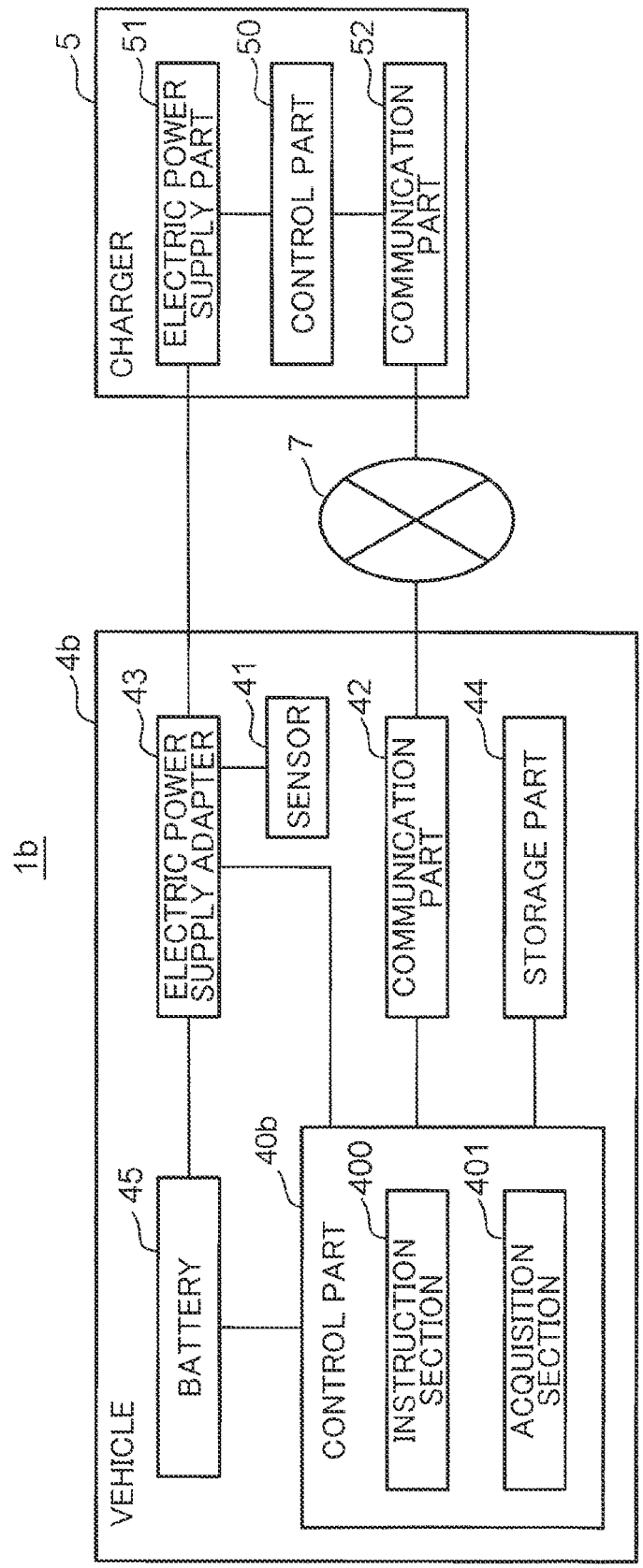
FIG. 7 shows an overall configuration of a degradation analyzing system in a fifth modification.

FIG. 7 shows an overall configuration of a degradation analyzing system 1*b* in a fifth modification. Specifically, as shown in FIG. 7, in the degradation analyzing system 1*b* in this modification, a vehicle 4*b* (charge controlling device) includes: a storage part 44 similar to the storage part 24 (FIG. 1); and an electric power supply adapter 43, a sensor 41, and a communication part 42 respectively similar to the electric power supply adapter 33, the sensor 31, and the communication part 32 each included in the adapter 3 (FIG. 1). The vehicle 4*b* further includes a control part 40*b* similar to the control part 30*a* of the adapter 3*a* (FIG. 6). The control part 40*b* serves as an instruction section 400 and an acquisition section 401 respectively similar to the instruction section 300 and the acquisition section 301. The communication part 42 of the vehicle 4*b* and the communication part 52 of the charger 5 may directly communicate with each other without passing through the network 7 in this modification as well.

Sixth Modification

In the above-described embodiment and modifications, the charger 5 may include: an electric power supply adapter similar to the electric power supply adapter 33 (FIG. 1); and a sensor similar to the sensor 31 (FIG. 1), and the control part 50 (FIG. 1, FIG. 6, FIG. 7) of the charger 5 may calculate, on the basis of a detection result from the sensor, a charge capacity of the battery 45. Furthermore, the control part 50 (FIG. 1, FIG. 6, FIG. 7) of the charger 5 may send operational data indicating a detected open circuit voltage and a calculated charge capacity of the battery 45 to the acquisition section 201 (FIG. 1) of the server 2, to the acquisition section 301 (FIG. 6) of the adapter 3*a*, and to the acquisition section 401 (FIG. 7) of the vehicle 4*b* via the communication part 52 (FIG. 1, FIG. 6, FIG. 7).

One of the vehicle 4 (FIG. 1), 4*b* (FIG. 7), the adapter 3 (FIG. 1), 3*a* (FIG. 6), the server 2 (FIG. 1), and the charger 5 (FIG. 1, FIG. 6, FIG. 7) may be provided with an electric power supply adapter similar to the electric power supply adapter 33 (FIG. 1) and a sensor similar to the sensor 31 (FIG. 1) to transmit a detection result from the sensor to the server 2 (FIG. 1), to the adapter 3*a* (FIG. 6), and the vehicle 4*b* (FIG. 7) as needed. In addition, each of the acquisition section 201 (FIG. 1) of the server 2, the acquisition section 301 (FIG. 6) of the adapter 3a, and the acquisition section 401 (FIG. 7) of the vehicle 4b may calculate a charge capacity of the battery 45 to acquire operational data.

INDUSTRIAL APPLICABILITY

This disclosure is useful to appropriately estimate a degradation state of a secondary battery by employing the non-destructive analysis while keeping a daily operation of the secondary battery.

The invention claimed is:

1. An information processing method, by a computer, comprising:
    instructing a charger for charging a battery to:
        repeat a charge control including a set of charging having a first interval and charging suspension having a second interval; and
        finish the charge control when a charge amount reaches a predetermined amount;
    acquiring a time series of operational data indicating a voltage and a charge capacity of the battery at an end time of each second interval of the charge control, wherein:
        the second interval is set to be longer when the charge capacity falls within the first range than when the charge capacity is out of the first range, and
        the time series of the operational data comprise the operational data measured at the end time of each second interval, from initiation of the charging until the charge amount reaches the predetermined amount; and
    estimating a degradation state of the battery based on the time series of the operational data.

2. The information processing method according to claim 1, wherein the second interval is shorter than the first interval.

3. The information processing method according to claim 1, wherein the number of repetitions of the charge control is set so that the charge amount reaches the predetermined amount within a predetermined time.

4. The information processing method according to claim 1, wherein the first interval and the second interval are set so that the charge amount reaches the predetermined amount within a predetermined time.

5. The information processing method according to claim 1, wherein the instruction is made when a predetermined time or longer is ensured to charge the battery.

6. The information processing method according to claim 1, further comprising:
    calculating differential data of the voltage to the charge capacity by using the time series of the operational data; and
    the estimating the degradation state of the battery comprises estimating the degradation state of the battery by analyzing a peak in the differential data.

7. The information processing method according to claim 6, wherein the peak in the differential data includes at least one of a first peak concerning the positive electrode of the battery and a second peak concerning the negative electrode of the battery, and,
    in the estimation of the degradation state of the battery, a degradation state of at least one of the positive electrode and the negative electrode of the battery is estimated by analyzing at least one of the first peak and the second peak.

8. The information processing method according to claim 1, wherein the number of repetitions of the charge control is set to be larger when the charge capacity falls within a first range than when the charge capacity is out of the first range.

9. The information processing method according to claim 1, wherein a charging electric current in the charge control is set to be smaller when the charge capacity falls within the first range than when the charge capacity is out of the first range.

10. The information processing method according to claim 1, wherein the first range represents a range of the charge capacity that has the peak in the differential data of the voltage to the charge capacity, the differential data being calculated by using the time series of the operational data.

11. A charge control device that controls a charger for charging a battery, comprising:
    a memory; and
    a processor configured to:
    instruct the charger to repeat a charge control including a set of charging having a first interval and charging suspension having a second interval, and finish the charge control when a charge amount reaches a predetermined amount; and
    acquire operational data indicating a voltage and a charge capacity of the battery at an end time of each second interval of the charge control, wherein:
        the second interval is set to be longer when the charge capacity falls within the first range than when the charge capacity is out of the first range, and
        the time series of the operational data comprises the operational data measured at the end time of each second interval, from initiation of the charging until the charge amount reaches the predetermined amount; and
    estimate a degradation state of the battery based on the time series of the operational data.

* * * * *